(12) United States Patent
Li et al.

(10) Patent No.: US 11,474,712 B2
(45) Date of Patent: Oct. 18, 2022

(54) METHOD, APPARATUS, DEVICE AND STORAGE MEDIUM FOR MANAGING ACCESS REQUEST

(71) Applicant: Beijing Baidu Netcom Science and Technology Co., Ltd., Beijing (CN)

(72) Inventors: Lin Li, Beijing (CN); Yu Zhang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 205 days.

(21) Appl. No.: 16/707,393

(22) Filed: Dec. 9, 2019

(65) Prior Publication Data

US 2020/0371696 A1 Nov. 26, 2020

(30) Foreign Application Priority Data

May 24, 2019 (CN) .......................... 201910440376.7

(51) Int. Cl.
*G06F 3/06* (2006.01)
*G06F 12/14* (2006.01)

(52) U.S. Cl.
CPC ............ *G06F 3/0622* (2013.01); *G06F 3/067* (2013.01); *G06F 3/0653* (2013.01); *G06F 3/0659* (2013.01); *G06F 12/1441* (2013.01)

(58) Field of Classification Search
CPC ......... G06F 3/06–0689; G06F 12/1441; G06F 3/0622; G06F 3/0653; G06F 3/0659; G06F 3/067
See application file for complete search history.

(56) References Cited

U.S. PATENT DOCUMENTS

| 9,239,793 | B2 | 1/2016 | Riguer et al. | |
|---|---|---|---|---|
| 9,378,572 | B2 | 6/2016 | Rao et al. | |
| 2010/0180086 | A1* | 7/2010 | Allen | G06F 3/0676 711/147 |
| 2010/0262721 | A1* | 10/2010 | Asnaashari | G06F 3/0659 710/22 |
| 2013/0024625 | A1* | 1/2013 | Benhase | G06F 12/12 711/136 |

(Continued)

FOREIGN PATENT DOCUMENTS

| JP | H09091098 A | 4/1997 |
|---|---|---|
| JP | 2015505091 A | 2/2015 |
| JP | 2015526806 A | 9/2015 |

*Primary Examiner* — Nicholas J Simonetti
(74) *Attorney, Agent, or Firm* — The Webb Law Firm

(57) ABSTRACT

A method, an apparatus, a device, and a storage medium for managing an access request are provided. The method includes acquiring a group of access requests for performing data access to a storage device in a computing system, the group of access requests indicating access operations for a group of addresses in the storage device respectively; arranging an order of the group of addresses based on address ranges of the addresses of the group of addresses in the storage device; generating a merged request based on at least one part of the access requests with consecutive addresses among the group of access requests with the arranged addresses; and executing a data access operation on the storage device based on the merged request, the method being implemented in a driver of the storage device, and the driver being implemented in a user state of the computing system.

19 Claims, 9 Drawing Sheets

(56) References Cited

U.S. PATENT DOCUMENTS

| | | | |
|---|---|---|---|
| 2015/0213047 A1* | 7/2015 | Madan | G06F 16/1748 |
| | | | 707/692 |
| 2018/0189101 A1* | 7/2018 | Xu | G06F 9/5088 |
| 2020/0081654 A1* | 3/2020 | Chan | G06F 3/0679 |
| 2020/0097212 A1* | 3/2020 | Lakshman | H04L 69/22 |
| 2021/0026768 A1* | 1/2021 | Pierson | G06F 9/30101 |

* cited by examiner

METHOD, APPARATUS, DEVICE AND STORAGE MEDIUM FOR MANAGING ACCESS REQUEST

CROSS-REFERENCE TO RELATED APPLICATION

This application claims priority to Chinese Patent Application No. 201910440376.7 filed May 24, 2019, the disclosure of which is hereby incorporated by reference in its entirety.

TECHNICAL FIELD

Implementations of the present disclosure generally relate to storage device management, and more specifically to a method, apparatus, device, and computer storage medium for managing an access request for accessing to a storage device.

BACKGROUND

With the development of computer technology, at present, high-speed storage devices with a higher hardware access speed have emerged. Whist improving the hardware speed, the drivers of the storage devices are also required to be modified accordingly, to utilize the potentials of the high-speed storage devices to the maximum extent. In this case, how to more efficiently manage access to the high-speed storage devices has become a technological problem.

SUMMARY

According to example embodiments of the present disclosure, a scheme for managing an access request is provided.

In a first aspect of the present disclosure, a method for managing an access request is provided. The method includes acquiring a group of access requests for performing a data access to a storage device in a computing system, the group of access requests indicating access operations for a group of addresses in the storage device respectively; arranging an order of the group of addresses based on address ranges of the addresses of the group of addresses in the storage device; generating a merged request based on at least one part of the access requests with consecutive addresses among the group of access requests with the arranged addresses; and executing a data access operation on the storage device based on the merged request, the method being implemented in a driver of the storage device, and the driver being implemented in a user state of the computing system.

In a second aspect of the present disclosure, an apparatus for managing an access request is provided. The apparatus includes an acquiring module configured to acquire a group of access requests for performing a data access to a storage device in a computing system, the group of access requests indicating access operations for a group of addresses in the storage device respectively; an arranging module configured to arrange an order of the group of addresses based on address ranges of the addresses of the group of addresses in the storage device; a generating module configured to generate a merged request based on at least one part of the access requests with consecutive addresses among the group of access requests with the arranged addresses; and an executing module configured to execute a data access operation on the storage device based on the merged request, the apparatus being implemented in a driver of the storage device, and the driver being implemented in a user state of the computing system.

In a third aspect of the present disclosure, an electronic device is provided, including one or more processors; and a storage apparatus for storing one or more programs, when executed by the one or more processors, cause the one or more processors to implement the method according to the first aspect of the disclosure.

In a fourth aspect of the present disclosure, a computer readable storage medium is provided, storing a computer program thereon, where the program, when executed by a processor, implements the method according to the first aspect of the disclosure.

It should be understood that the content described in the summary section of the disclosure is not intended to limit the key or important features of the embodiments of the present disclosure, nor is it intended to limit the scope of the present disclosure. Other features of the present disclosure will become easily understood by the following description.

BRIEF DESCRIPTION OF THE DRAWINGS

In conjunction with the accompanying drawings and with reference to detailed description below, the above and other features, advantages, and aspects of various implementations of the present disclosure will become more apparent. Identical or similar reference numerals in the accompanying drawings represent identical or similar elements.

DETAILED DESCRIPTION OF EMBODIMENTS

Implementations of the present disclosure will be described below in more detail with reference to the accompanying drawings. While some implementations of the present disclosure are shown in the accompanying drawings, it should be understood that the present disclosure may be implemented in various forms, and should not be construed as being limited to the embodiments set forth herein. On the contrary, these implementations are provided to more thoroughly and completely understand the present disclosure. It should be understood that the accompanying drawings and implementations of the present disclosure merely play an exemplary role, and are not intended to limit the protection scope of the present disclosure.

In the description of the implementations of the present disclosure, the term "including" and similar wordings thereof should be construed as open-ended inclusions, i.e., "including but not limited to." The term "based on" should be construed as "at least partially based on." The term "an implementation" or "the implementation" should be construed as "at least one implementation." The terms, such as "first," and "second," may refer to different or identical objects. Other explicit and implicit definitions may be further included below.

Figure 1:
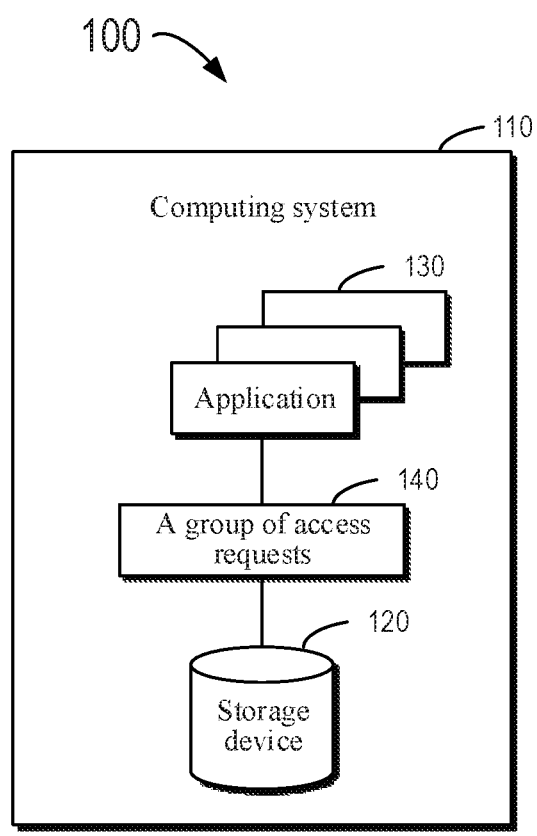
FIG. 1 schematically shows a block diagram of an example process of performing an access to a storage device in a computing system.

Hereinafter, an application environment of the present disclosure is first described with reference to FIG. 1. FIG. 1 schematically shows a block diagram 100 of an example process of performing an access to a storage device 120 in a computing system 110. As shown in FIG. 1, the computing system 110 may include one or more storage devices 120, and one or more applications 130 running in the computing system 110 (or remotely accessing to the computing system 110) may send a group of access requests 140, for accessing to data in the storage device 120.

With the development of hardware technology of storage devices, high-speed storage devices have been developed, and the high-speed storage devices occupy an increasing proportion in data centers. Compared with conventional low-speed storage devices, the high-speed storage devices have very high data access speed and low access delay. For example, NVMe SSD is thousands of times faster than a conventional SAS or SATA Winchester disk, and 5 to 10 times faster than earlier SATA SSD. Therefore, it is expected that the drivers of the storage devices can be improved with the development of hardware technology, so as to better play the advantages of the high-speed storage devices.

The performance and efficiency of a traditional driver implemented in a kernel state is difficult to give play to the advantages of the high-speed devices. In order to improve the response efficiency of the storage device 120, at present, a technical solution of migrating a driver of the storage device 120 from a kernel state to a user state has been presented. In this way, kernel context switching can be avoided, thereby reducing burdens of a central processing unit (CPU), and allowing the CPU to use more instruction cycles in actual data processing and storage.

However, during an operation of implementing access to the storage device 120 in the user state, an access request for the storage device 120 is processed by polling, and the access request is quickly distributed, thereby reducing waiting duration and reducing delay. However, each access request is processed separately in this way, resulting in failure to comprehensively consider a plurality of access requests to achieve optimization. Implementing access to the storage device 120 in the user state can improve the performances of read and write operations of some data, which, however, does not produce beneficial effects on read and write operations of some other types of data, or even reduces the data access performance. Therefore, it is expected to more efficiently manage the access request.

In order to at least partially solve the defects in the above technical solutions, a method for managing an access request implemented in a user state is provided according to an example implementation of the present disclosure. In this method, an access mode of a group of received access requests is considered. When address spaces in the storage device 120 accessed by a plurality of access requests of the group of access requests are consecutive address spaces, the plurality of access requests is merged. Then, a data access operation may be performed on the storage device 120 based on the merged access request. It can be understood that the above method may be implemented in a driver of the storage device 120, and various implementations of the present disclosure may be implemented in a user state of the computing system 110 without the need of involvement of a kernel state of the computing system 110.

According to an example implementation of the present disclosure, running the driver in the user state of the computing system 110 means that the driver does not involve the kernel state, which can avoid the kernel context switching and interrupt, saves a lot of processing costs of the CPU, and allows the CPU to execute actual data storage in more clock cycles.

An operating system of the computing system 110 generally may be divided into a kernel and a plurality of servers. Here, a microkernel is mainly used for (1) process (thread) management (process or thread scheduling), (2) low-level memory management (physical address transformation from a logical space of a user program to a memory space), and (3) interrupt and trap management (interrupt and trap). Because of the microkernel structure, the driver may run in the kernel state or the user state, and the kernel state and the user state are two running levels of the operating system.

When a task (process) executes a system call, and is trapped in a kernel code for execution, the process is referred to as being in a kernel running state (or kernel state for short), while other execution modes of the process belong to the user state. Generally, the user program runs in the user state, and the operating system runs in the kernel state. Conversion between the user state and the kernel state may be performed, for example, through system call, exception, and peripheral device interrupt. Switching between the user state and the kernel state results in extra time costs and computing resource costs.

With the example implementations of the present disclosure, the process of managing an access request can be performed completely in the user state without involving the kernel state. In this way, switching between the user state and the kernel state can be avoided, thus improving the performance of the whole computing system 110. Further, by using the example implementations of the present disclosure, and implementing the above method in the user state, relatively scattered access requests may be merged into an access request for accessing to a large spatial range. In this way, the workload generated for processing each scattered access request can be reduced. Further, the above method is implemented in the user state without involving the kernel state, thus reducing the workload of the CPU, and allowing the CPU to allocate more instruction cycles to process other affairs.

Figure 2:
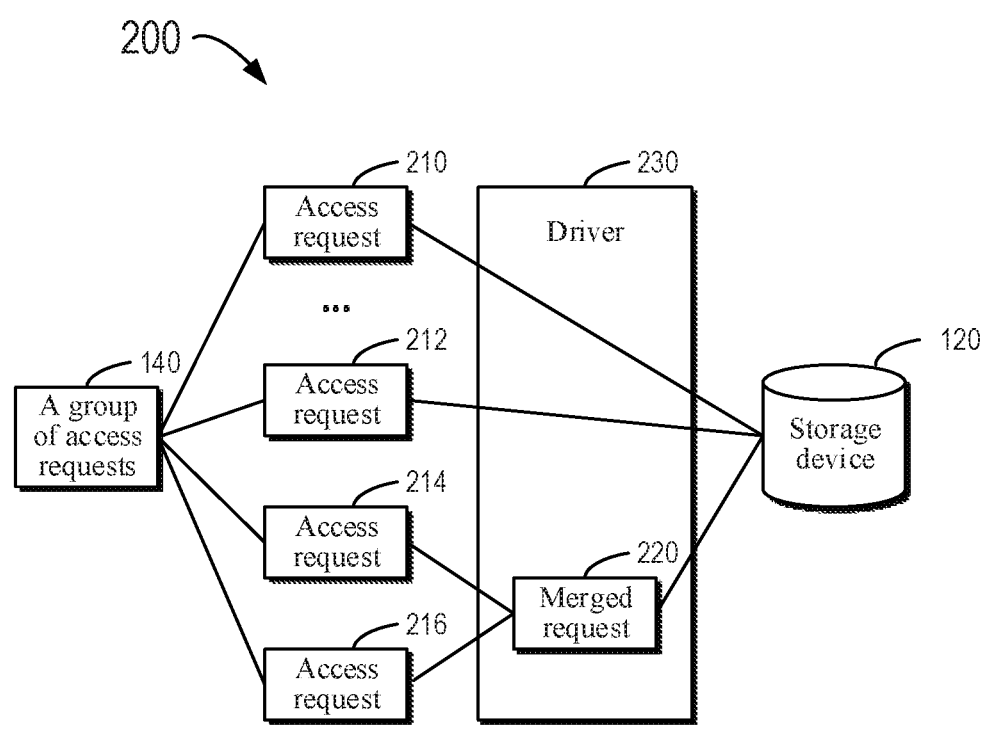
FIG. 2 schematically shows a block diagram of a technical solution for managing an access request according to an example implementation of the present disclosure.

Hereinafter, more details of an example implementation of the present disclosure will be described with reference to FIG. 2. FIG. 2 schematically shows a block diagram 200 of a technical solution for managing an access request according to an example implementation of the present disclosure. As show in FIG. 2, a group of access requests 140 may include received access requests for executing accesses to the storage device 120. For example, an access request list 140 may include access requests 210, 212, 214, and 216, etc. According to the example implementation of the present disclosure, a merge process may be implemented for a driver 230 of the storage device 120. Referring to FIG. 2, for example, access requests 214 and 216 for accessing consecutive address spaces may be merged to form a new merged request 220.

It will be understood that the group of access requests 140 may include a plurality of access requests. The access requests 210, . . . , and 212, that do not involve consecutive address spaces may be processed by an existing approach. For example, the storage device 120 may be accessed respectively based on each access request of the access requests 210, . . . , and 212. For example, assuming that the access requests 210, . . . , and 212 are access requests of a read type, then data within an address range specified by the access requests 210, . . . , and 212 may be read respectively from the storage device 120. For another example, assuming that the access requests 210, . . . , and 212 are access requests of a write type, then corresponding data may be written into the address range specified by the access requests 210, . . . , and 212 in the storage device 120.

Figure 3:
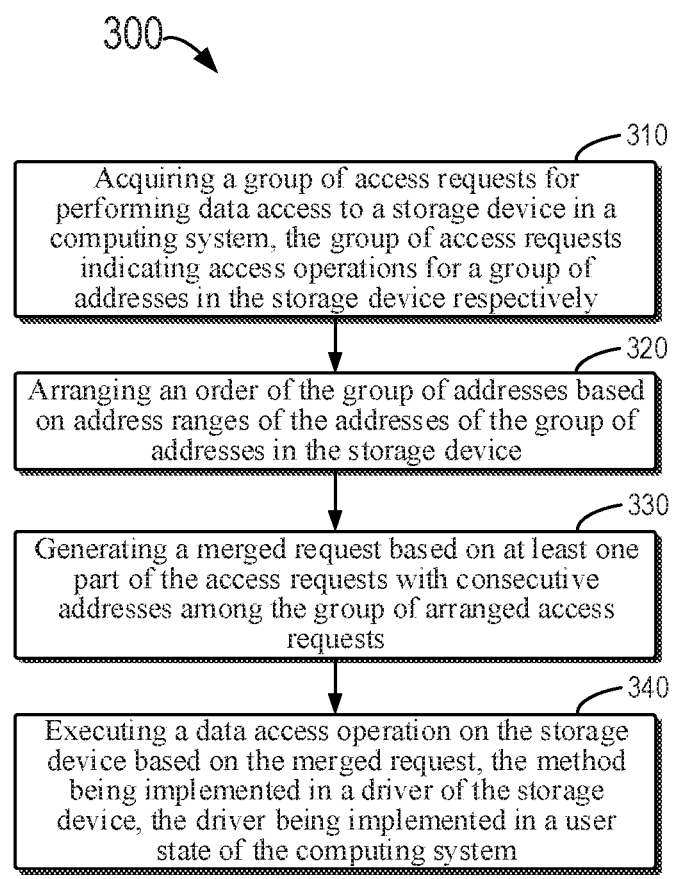
FIG. 3 schematically shows a flowchart of a method for managing an access request according to an example implementation of the present disclosure.

FIG. 3 schematically shows a flowchart of a method 300 for managing an access request according to an example implementation of the present disclosure. The method 300 may be implemented in the driver 230 of the storage device 120, and the driver 230 here is implemented in a user state of the computing system 110.

As show in FIG. 3, block 310 includes acquiring the group of access requests 140 for performing data access to the storage device 120 in the computing system 110. Here, the group of access requests 140 indicates access operations for a group of addresses in the storage device 120 respectively. In other words, each access request indicates one data access operation for the storage device 120.

Figure 4:
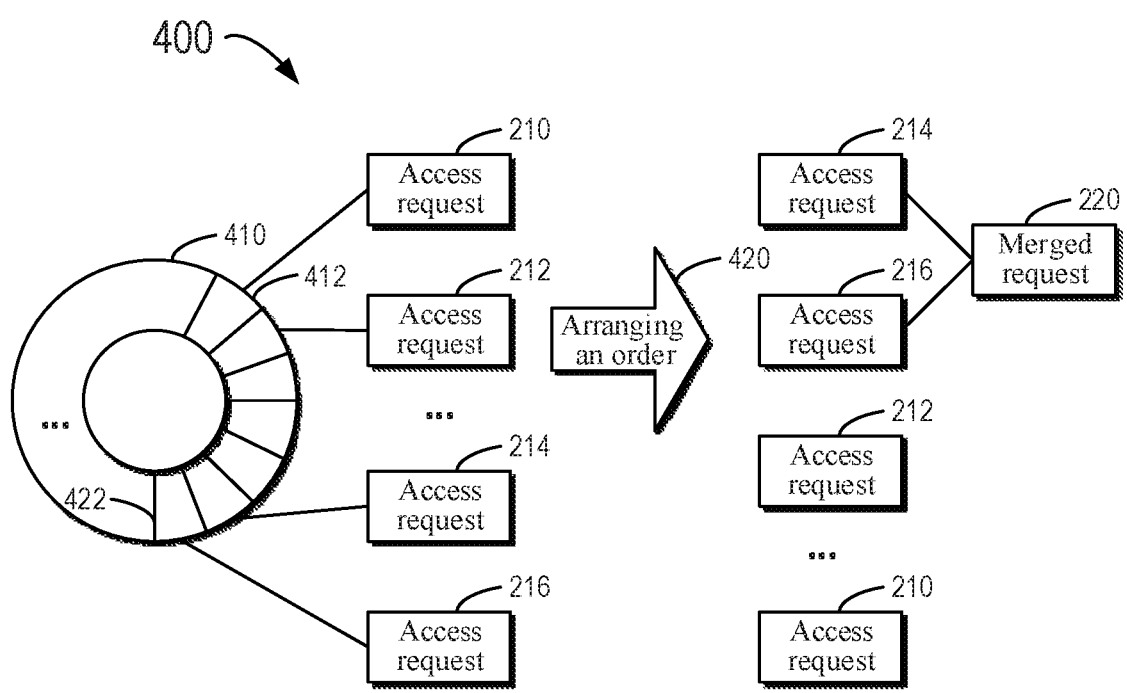
FIG. 4 schematically shows a block diagram of a process of arranging an order for a group of access requests and generating a merged request based on the group of arranged access requests according to an example implementation of the present disclosure.

According to an example implementation of the present disclosure, the group of access requests 140 may be acquired from a circular linked list 410 storing access requests for accessing to the storage device 120. Hereinafter, more details related to the circular linked list will be described with reference to FIG. 4. FIG. 4 schematically shows a block diagram 400 of a process of arranging an order of the group of access requests 140 and generating a merged request based on the group of arranged access requests according to an example implementation of the present disclosure. As show in FIG. 4, the circular linked list 410 may store a plurality of received access requests for performing access to the storage device 120. The circular linked list 410 may include: a head pointer 412 for pointing to a first access request of to-be-processed access requests; and a tail pointer 422 for pointing to a last access request of the to-be-processed access requests.

According to an example implementation of the present disclosure, the group of access requests 140 may be selected from the circular linked list 410 at a preset time interval. It will be understood that if data specified by the access request in the storage device 120 is immediately accessed each time an access request is received, the accesses to the storage device 120 are too frequent. In particular, if a small amount of data is involved in the access requests, frequently executing the access request for the storage device 120 causes reduced overall performance of the storage system 110. In some implementations of the present disclosure, a length of the preset time interval may be specified. In this way, the overall performance of the access operation may be improved by centralized processing of the plurality of access requests received within the preset time interval.

According to an example implementation of the present disclosure, the number of access requests of the group of access requests 140 is smaller than or equal to a threshold number. The threshold number may be set to a preset number, e.g., 32, 16, or 8. For example, the number may be determined based on the frequency of receiving the access requests or the number of received access requests, or based on the requirements of the computing system 110 for response time. As shown in FIG. 4, the access requests 210, 212, . . . , 214, and 216 may be acquired from the circular linked list 410. It can be understood that each access request here may include a corresponding access address, and thus the group of access requests 140 may include a group of access addresses.

Returning to FIG. 3, block 320 includes arranging an order of the group of addresses based on an address range of each address of the group of addresses in the storage device. It can be understood that, the group of access requests 140 here may include access requests of a read type and access requests of a write type. According to an example implementation of the present disclosure, access requests of a same type may be arranged in an order. For example, the access requests of the read type of the group of access requests 140 may be first processed. The access requests of the read type may be selected from the group of access requests 140, and the selected access requests of the read type may be arranged in ascending order or in descending order. According to an example implementation of the present disclosure, the access requests of the write type of the group of access requests 140 may be processed similarly.

As show in FIG. 4, the access requests 210, 212, . . . , 214, and 216 may be arranged 420 in an order, and arranged access requests 214, 216, 212, . . . , and 210 are obtained. Then, the merged request 220 may be generated based on the arranged access requests. Returning to FIG. 3, block 330 includes generating a merged request 220 based on at least one part of the access requests with consecutive addresses among the group of arranged access requests. Subsequent processing may be executed based on whether the addresses of the group of access requests 140 are consecutive. According to an example implementation of the present disclosure, only access requests of a same type can be merged, and thus it is further necessary to consider a type of each request when the merged request 220 is generated. As described above, if various access requests have been arranged respectively based on read requests and write requests, then the merged request may be generated directly based on the arranged requests.

According to an example implementation of the present disclosure, alternatively, types of the access requests may not be distinguished, and the group of access requests are directly arranged. In this case, it is first necessary to determine whether two access requests with consecutive addresses belong to a given type, and if a determining result is "YES", then the merged request 220 may be generated. If the two access requests belong to different types, even if the access addresses are consecutive, it is also necessary to execute separate processing for the two access requests respectively.

According to an example implementation of the present disclosure, for at least one part of the access requests, a plurality of consecutive access requests may be processed one by one respectively. Specifically, a first access request and a second access request having consecutive addresses with the first access request may be determined, and an address of the merged request 220 may be determined based on a start address of an address of the first access request and an end address of an address of the second access request. Hereinafter, how to generate the merged request 220 will be described respectively with reference to FIG. 5A and FIG. 5B.

Figure 5A:
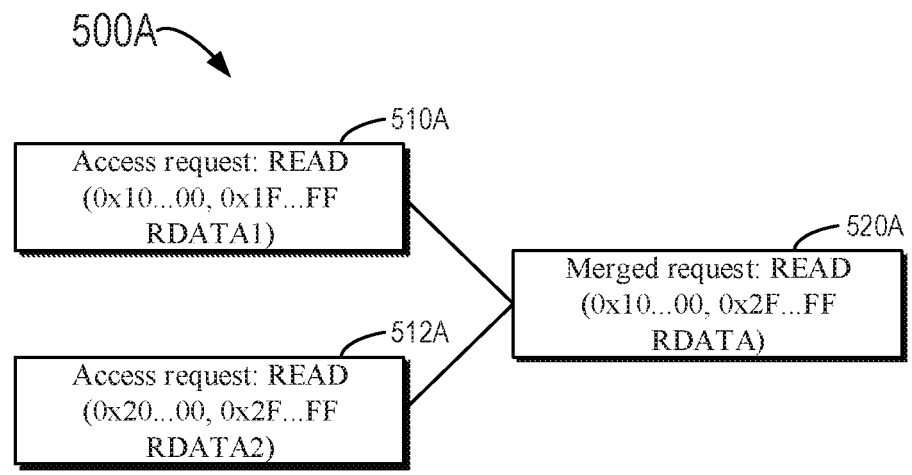
FIG. 5A schematically shows a block diagram of a process of generating a merged request based on two read requests according to an example implementation of the present disclosure.

FIG. 5A schematically shows a block diagram 500A of a process of generating a merged request based on two read requests according to an example implementation of the present disclosure. As shown in FIG. 5A, assuming that an access request 510A is a read request involving an address range (0x10 . . . 00, 0x1F . . . FF); and an access request 512A is a read request involving an address range (0x20 . . . 00, 0x2F . . . FF). In this case, a merged request 520A may be generated based on a start address "0x10 . . . 00" of the access request 510A and an end address "0x2F . . . FF" of the access request 512A. In this case, the merged request 520A involves data within a read address range (0x10 . . . 00, 0x2F . . . FF).

Figure 5B:
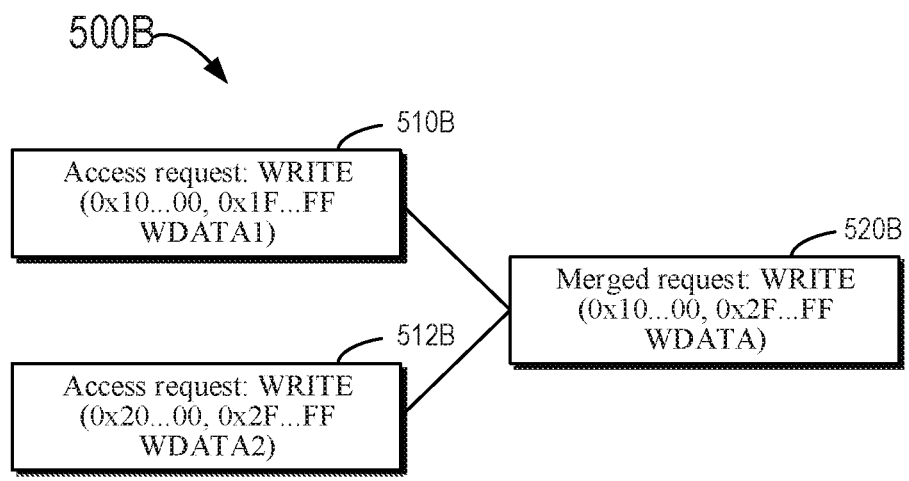
FIG. 5B schematically shows a block diagram of a process of generating a merged request based on two write requests according to an example implementation of the present disclosure.

FIG. 5B schematically shows a block diagram 500B of a process of generating a merged request based on two write requests according to an example implementation of the present disclosure. As shown in FIG. 5B, assuming that an access request 510B is a write request involving an address range (0x10 . . . 00, 0x1F . . . FF); and an access request 512B is a write request involving an address range (0x20 . . . 00, 0x2F . . . FF). In this case, a merged request 520B may be generated based on a start address "0x10 . . . 00" of the access request 510B and an end address "0x2F . . . FF" of the access request 512B. In this case, the merged request 520B involves writing data "DATA1" in the access request 510B and data "DATA2" in the access request 512B into an address range (0x10 . . . 00, 0x2F . . . FF).

It can be understood that if the address range involved in the merged request is very large, then the data read/write time may be very long. Thus, the address range involved in the merged access request may further be specified to be smaller than or equal to a preset threshold. In other words, in the process of merging the group of access requests, if a merged address range of the merged access request is found to be smaller than the preset threshold, then the merging process is considered effective; otherwise, the merging process is not executed, or only a part of access requests with consecutive addresses are merged.

Returning to FIG. 3, block 340 includes executing a data access operation on the storage device 120 based on the merged request 220. In this case, an access type of the merged request 220 is identical to the type of each access request prior to merging. Returning to the example shown in FIG. 5A, here the merged request 520A is READ (0x10 . . . 00, 0x2F . . . FF, RDATA), which represents reading data within the address range (0x10 . . . 00, 0x2F . . . FF) to a data block RDATA. After executing the merged request 520A, the data block RDATA includes data in data blocks RDATA1 and RDATA2 that originally need to be returned by the access requests 510A and 512A respectively.

According to an example implementation of the present disclosure, it is further necessary to split the returned large block of data, to respond to the access requests 510A and 512A respectively. Specifically, when the access type of the group of access requests and the merged request is a read type, data (e.g., the data within the data block RDATA) may be read from a merged address specified by the merged request in the storage device. Then, the read data may be split based on an address of a first access request and an address of a second access request respectively. Hereinafter, more details related to the split data will be described with reference to FIG. 6A.

Figure 6A:
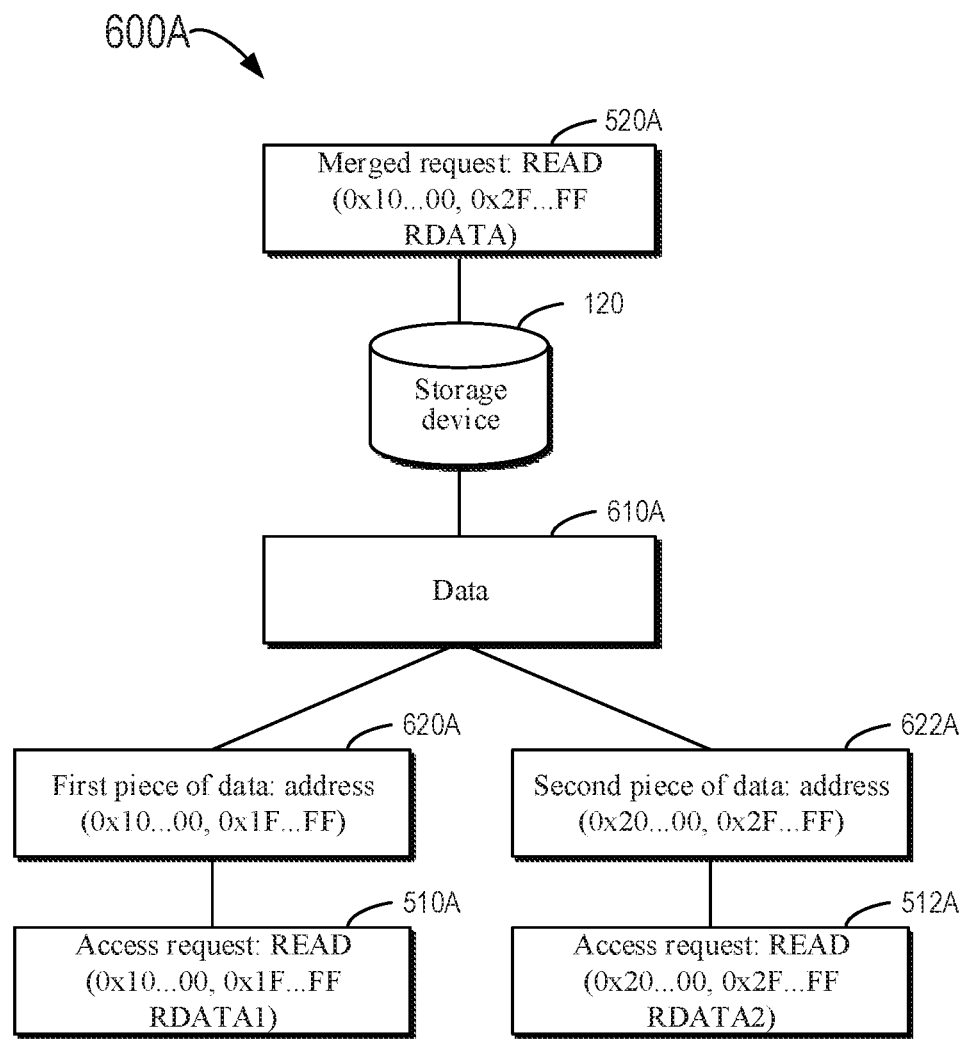
FIG. 6A schematically shows a block diagram of a process for splitting read data according to an example implementation of the present disclosure.

FIG. 6A schematically shows a block diagram 600A of a process for splitting read data according to an example implementation of the present disclosure. As shown in FIG. 6A, the merged request 520A may be executed on the storage device 120, to acquire data 610A. Then, the data 610A may be split into a first piece of data 620A and a second piece of data 622A respectively based on an address (0x10 . . . 00, 0x1F . . . FF) of the access request 510A and an address (0x20 . . . 00, 0x2F . . . FF) of the access request 512A.

Then, corresponding data may be returned to each access request respectively. As shown in FIG. 6A, the first piece of data 620A may be returned to the access request 510A, and the second piece of data 622A may be returned to the access request 512A. In this case, the first piece of data 620A may be written into the data block RDATA1 associated with the access request 510A, and the second piece of data 622A may be written into the data block RDATA2 associated with the access request 512A.

According to an example implementation of the present disclosure, merged data may be generated based on the first piece of data in a first access request and the second piece of data in a second access request in response to an access type of a group of access requests being a write type. Hereinafter, an execution process related to a write request will be described with reference to FIG. 6B.

Figure 6B:
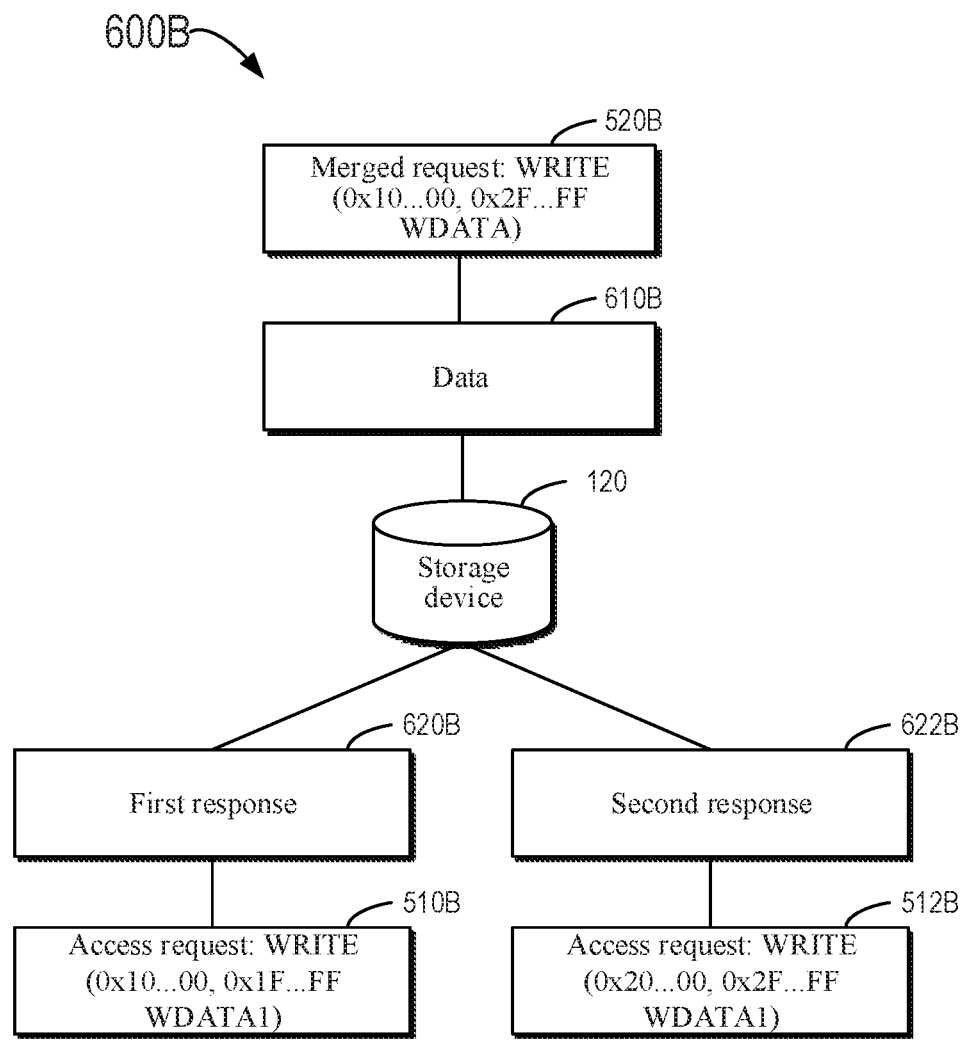
FIG. 6B schematically shows a block diagram of a process of writing data into a storage device and returning responses to two write requests respectively according to an example implementation of the present disclosure.

FIG. 6B schematically shows a block diagram 600B of a process of writing data into a storage device and returning responses to the two write requests respectively according to an example implementation of the present disclosure. As shown in FIG. 6B, the merged request 520B may be executed on the storage device 120, to write data 610B into the storage device 120. Then, in the case where the merged request 520B has been successfully executed, a first response 620B may be provided to the access request 510B, to indicate that the access request 510B has been successfully executed; a second response 620B may also be provided to the access request 512B, to indicate that the access request 512B has been successfully executed.

How to process the merged request has been described above with reference to FIGS. 5A, 5B, 6A, and 6B. It will be understood that the group of access requests 140 may include access requests with non-consecutive addresses. In this case, for other access requests except for access requests with consecutive addresses among the group of access requests 140, a corresponding data access operation may be executed for the storage device 120 based on each of the other access requests. Returning to FIG. 4, the access requests 214 and 216 have been merged to form a merged request 220, while the access requests 212 and 210 are not consecutive, thus the access requests 212 and 210 may be executed respectively for the storage device 120.

Each access request of the group of access requests 140 may be processed with reference to the above approach described in FIG. 3 to FIG. 6B. According to an example implementation of the present disclosure, after the group of access requests 140 have been successfully processed, a pointer of a circular linked list may also be modified, to indicate the group of access requests having been processed. It can be understood that the method 300 described above may be executed periodically. During execution of the method 300, the number of access requests in the circular linked list 410 may be increased. When the number of access requests in the circular linked list 410 reaches a preset threshold, executing the method 300 may be re-triggered. In this way, while acquiring the group of access requests 140 causes certain time costs, merging the access requests can greatly reduce the performance costs of frequently executing scattered consecutive access requests for the storage device 120. In particular, when the storage device 120 frequently executes a large number of consecutive access requests, the overall performance of the computing system 110 may be significantly improved.

Figure 7:
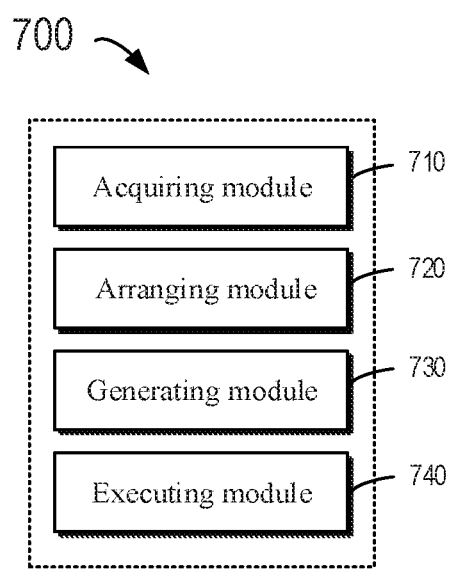
FIG. 7 schematically shows a block diagram of an apparatus for managing an access request according to an example implementation of the present disclosure.

A plurality of implementations of the method 300 of how to manage an access request has been described above in detail. According to an example implementation of the present disclosure, an apparatus for managing an access request is further provided. Hereinafter, the apparatus will be described in detail with reference to FIG. 7. FIG. 7 schematically shows a block diagram of an apparatus 700 for managing an access request according to an example implementation of the present disclosure. As shown in FIG. 7, the apparatus 700 includes: an acquiring module 710 configured to acquire a group of access requests for performing data access to a storage device in a computing system, the group of access requests indicating an access operation for a group of addresses in the storage device respectively; an arranging module 720 configured to arrange an order of the group of addresses based on an address range of each address of the group of addresses in the storage device; a generating module 730 configured to generate a merged request based on at least one part of the access requests with consecutive addresses among the group of arranged access requests; and an executing module 740 configured to execute a data access operation on the storage device based on the merged request, the apparatus 700 being implemented in a driver of the storage device, and the driver being implemented in a user state of the computing system.

According to an example implementation of the present disclosure, the arranging module 720 includes: a merging module configured to generate the merged request, in response to determining the at least one part of the access requests having a given access type, where the access type includes a read type and a write type.

According to an example implementation of the present disclosure, the arranging module 720 includes: a request determining module configured to determine a first access request and a second access request having consecutive addresses with the first access request among the at least one part of the access requests; and an address determining module configured to determine a merged address of the merged request based on a start address of an address of the first access request and an end address of an address of the second access request.

According to an example implementation of the present disclosure, the apparatus includes: a threshold module configured to generate the merged request, in response to determining a range of the merged address of the merged request being smaller than or equal to a preset threshold.

According to an example implementation of the present disclosure, the executing module 740 includes: a data reading module configured to read data from the merged address in the storage device, in response to determining the access type of the group of access requests being the read type; a data determining module configured to determine a first piece of data associated with the first access request and a second piece of data associated with the second access request respectively from the read data based on the address of the first access request and the address of the second access request; and a data returning module configured to return the first piece of data to the first access request and return the second piece of data to the second access request.

According to an example implementation of the present disclosure, the executing module 740 includes: a data merging module configured to generate merged data based on the first piece of data in the first access request and the second piece of data in the second access request in response to the access type of the group of access requests being the write type; and a write responding module configured to return a first response to the first access request and return a second response to the second access request, in response to writing the merged data into the merged address in the storage device.

According to an example implementation of the present disclosure, the apparatus further includes: a request executing module configured to execute the data access operation on the storage device based on other access requests except for the at least one part of the access requests of the group of access requests.

According to an example implementation of the present disclosure, the acquiring module includes: a request acquiring module configured to acquire the group of access requests from a circular linked list storing access requests for accessing to the storage device.

According to an example implementation of the present disclosure, the apparatus further includes: a request selecting module configured to select the group of access requests from the circular linked list within a preset time interval, the number of access requests of the group of access requests being smaller than or equal to a threshold number.

According to an example implementation of the present disclosure, the apparatus further includes: a modifying module configured to modify a pointer of the circular linked list to indicate the group of access requests being processed.

Figure 8:
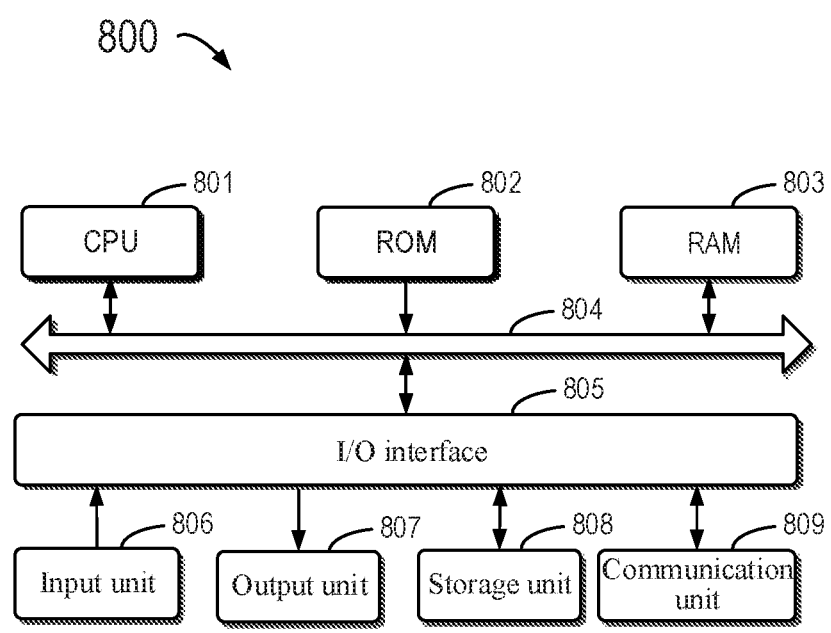
FIG. 8 shows a block diagram of a computing device that can be configured to implement a plurality of implementations of the present disclosure.

FIG. 8 shows a block diagram of a computing device 800 that can be configured to implement a plurality of implementations of the present disclosure. The device 800 may be configured to implement the method described in FIG. 3. As shown in the figure, the device 800 includes a central processing unit (CPU) 801, which may execute various appropriate actions and processes in accordance with computer program instructions stored in a read-only memory (ROM) 802 or computer program instructions loaded into a random access memory (RAM) 803 from a storage unit 808. The RAM 803 may further store various programs and data required by operations of the device 800. The CPU 801, the ROM 802, and the RAM 803 are connected to each other through a bus 804. An input/output (I/O) interface 805 is also connected to the bus 804.

A plurality of components in the device 800 is connected to the I/O interface 805, including: an input unit 806, such as a keyboard, and a mouse; an output unit 807, such as various types of displays and speakers; a storage unit 808, such as a magnetic disk, and an optical disk; and a communication unit 809, such as a network card, a modem, and a wireless communication transceiver. The communication unit 809 allows the device 800 to exchange information/data with other devices via a computer network, e.g., the Internet, and/or various telecommunication networks.

The processing unit 801 executes various methods and processes described above, such as the method 300. For example, in some implementations, the method 300 may be implemented in a computer software program that is tangibly included in a machine readable medium, such as the storage unit 808. In some implementations, a part or all of the computer program may be loaded and/or installed onto the device 800 via the ROM 802 and/or the communication unit 809. When the computer program is loaded into the RAM 803 and executed by the CPU 801, one or more steps of the method 300 described above may be executed. Alternatively, in other implementations, the CPU 801 may be configured to execute the method 300 by any other appropriate approach (e.g., by means of firmware).

According to example implementations of the present disclosure, a computer readable storage medium storing a computer program thereon is provided. The method described in some implementations of the present disclosure is implemented when the program is executed by a processor.

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for managing an access request, comprising:
   acquiring a group of access requests for performing a data access to a storage device in a computing system, the group of access requests indicating access operations for a group of addresses in the storage device respectively;
   arranging an order of the group of addresses based on address ranges of the addresses of the group of addresses in the storage device;
   generating a merged request based on at least one part of the access requests with consecutive addresses among the group of access requests with the arranged addresses; and
   executing a data access operation on the storage device based on the merged request, the method being implemented in a driver of the storage device, and the driver being implemented in a user state of the computing system,
   wherein generating the merged request based on at least one part of the access requests with consecutive addresses among the group of access requests with the arranged addresses comprises:
   determining whether at least one part of the access requests with consecutive addresses has a same access type, wherein the access type comprises a read type and a write type; and
   in response to determining that the at least one part of the access requests with consecutive addresses has the same access type, selecting, from the group of access requests with the arranged addresses, the at least one part of the access requests to generate the merged request,
   wherein in response to determining that the at least one part of the access requests with consecutive addresses has the same access type, selecting, from the group of access requests with the arranged addresses, the at least one part of the access requests to generate the merged request comprises:
   in response to determining that the at least one part of the access requests with consecutive addresses has the read type, selecting, from the group of access requests with the arranged addresses, the at least one part of the access requests to generate the merged request comprising the consecutive addresses and a designated data block to which data stored in the consecutive addresses is to be read.

2. The method according to claim 1, wherein the generating a merged request based on at least one part of the access requests with consecutive addresses among the group of arranged access requests comprises:
   determining a first access request and a second access request having consecutive addresses with the first access request among the at least one part of the access requests; and
   determining a merged address of the merged request based on a start address of an address of the first access request and an end address of an address of the second access request.

3. The method according to claim 2, wherein the method further comprises:
   generating the merged request, in response to determining a range of the merged address of the merged request being smaller than or equal to a preset threshold.

4. The method according to claim 2, wherein the executing a data access operation on the storage device based on the merged request comprises:
   reading data from the merged address in the storage device, in response to determining an access type of the group of access requests being the read type;
   determining a first piece of data associated with the first access request and a second piece of data associated with the second access request respectively from the read data based on the address of the first access request and the address of the second access request; and
   returning the first piece of data to the first access request and returning the second piece of data to the second access request.

5. The method according to claim 2, wherein the executing a data access operation to the storage device based on the merged request comprises:
   generating merged data based on the first piece of data in the first access request and the second piece of data in the second access request in response to determining an access type of the group of access requests being the write type; and
   returning a first response to the first access request and returning a second response to the second access request, in response to writing the merged data into the merged address in the storage device.

6. The method according to claim 1, wherein the method further comprises:
   executing the data access operation on the storage device based on other access requests except for the at least one part of the access requests of the group of access requests.

7. The method according to claim 1, wherein the acquiring a group of access requests for performing data access to a storage device in a computing system comprises:
   acquiring the group of access requests from a circular linked list storing access requests for accessing to the storage device.

8. The method according to claim 7, wherein the method further comprises:
   selecting the group of access requests from the circular linked list within a preset time interval, a number of access requests of the group of access requests being smaller than or equal to a threshold number.

9. The method according to claim 7, wherein the method further comprises:
   modifying a pointer of the circular linked list to indicate the group of access requests being processed.

10. The method according to claim 1, wherein a number of the group of access requests is set to a preset number, and the preset number is determined based on a frequency of receiving access requests or a number of the received access requests.

11. An apparatus for managing an access request, comprising:
   at least one processor; and
   a memory storing instructions, wherein the instructions when executed by the at least one processor, cause the at least one processor to perform operations, the operations comprising:
   acquiring a group of access requests for performing a data access to a storage device in a computing system, the group of access requests indicating access operations for a group of addresses in the storage device respectively;
   arranging an order of the group of addresses based on address ranges of the addresses of the group of addresses in the storage device;
   generating a merged request based on at least one part of the access requests with consecutive addresses among the group of access requests with the arranged addresses; and
   executing a data access operation on the storage device based on the merged request, the apparatus being implemented in a driver of the storage device, and the driver being implemented in a user state of the computing system,
   wherein generating the merged request based on at least one part of the access requests with consecutive addresses among the group of access requests with the arranged addresses comprises:
   determining whether at least one part of the access requests with consecutive addresses has a same access type, wherein the access type comprises a read type and a write type; and
   in response to determining that the at least one part of the access requests with consecutive addresses has the same access type, selecting, from the group of access requests with the arranged addresses, the at least one part of the access requests to generate the merged request,
   wherein in response to determining that the at least one part of the access requests with consecutive addresses has the same access type, selecting, from the group of access requests with the arranged addresses, the at least one part of the access requests to generate the merged request comprises:
   in response to determining that the at least one part of the access requests with consecutive addresses has the read type, selecting, from the group of access requests with the arranged addresses, the at least one part of the access requests to generate the merged request comprising the consecutive addresses and a designated data block to which data stored in the consecutive addresses is to be read.

12. The apparatus according to claim 11, wherein the generating a merged request based on at least one part of the access requests with consecutive addresses among the group of arranged access requests comprises:
   determining a first access request and a second access request having consecutive addresses with the first access request among the at least one part of the access requests; and
   determining a merged address of the merged request based on a start address of an address of the first access request and an end address of an address of the second access request.

13. The apparatus according to claim 12, wherein the operations further comprise:
   generating the merged request, in response to determining a range of the merged address of the merged request being smaller than or equal to a preset threshold.

14. The apparatus according to claim 12, wherein the executing a data access operation on the storage device based on the merged request comprises:
   reading data from the merged address in the storage device, in response to determining an access type of the group of access requests being the read type;

determining a first piece of data associated with the first access request and a second piece of data associated with the second access request respectively from the read data based on the address of the first access request and the address of the second access request; and returning the first piece of data to the first access request and return the second piece of data to the second access request.

15. The apparatus according to claim 12, wherein the executing a data access operation to the storage device based on the merged request comprises:

generating merged data based on the first piece of data in the first access request and the second piece of data in the second access request in response to an access type of the group of access requests being the write type; and returning a first response to the first access request and returning a second response to the second access request, in response to writing the merged data into the merged address in the storage device.

16. The apparatus according to claim 11, wherein the operations further comprise:

executing the data access operation on the storage device based on other access requests except for the at least one part of the access requests of the group of access requests.

17. The apparatus according to claim 11, wherein the acquiring a group of access requests for performing data access to a storage device in a computing system comprises:

acquiring the group of access requests from a circular linked list storing access requests for accessing to the storage device.

18. The apparatus according to claim 17, wherein the operations further comprise:

selecting the group of access requests from the circular linked list within a preset time interval, a number of access requests of the group of access requests being smaller than or equal to a threshold number.

19. A non-transitory computer readable storage medium, storing a computer program thereon, wherein the program, when executed by a processor, causes the processor to perform operations, the operations comprising:

acquiring a group of access requests for performing a data access to a storage device in a computing system, the group of access requests indicating access operations for a group of addresses in the storage device respectively;

arranging an order of the group of addresses based on address ranges of the addresses of the group of addresses in the storage device;

generating a merged request based on at least one part of the access requests with consecutive addresses among the group of access requests with the arranged addresses; and executing a data access operation on the storage device based on the merged request, the method being implemented in a driver of the storage device, and the driver being implemented in a user state of the computing system, wherein generating the merged request based on at least one part of the access requests with consecutive addresses among the group of access requests with the arranged addresses comprises:

determining whether at least one part of the access requests with consecutive addresses has a same access type, wherein the access type comprises a read type and a write type; and in response to determining that the at least one part of the access requests with consecutive addresses has the same access type, selecting, from the group of access requests with the arranged addresses, the at least one part of the access requests to generate the merged request, wherein in response to determining that the at least one part of the access requests with consecutive addresses has the same access type, selecting, from the group of access requests with the arranged addresses, the at least one part of the access requests to generate the merged request comprises:

in response to determining that the at least one part of the access requests with consecutive addresses has the read type, selecting, from the group of access requests with the arranged addresses, the at least one part of the access requests to generate the merged request comprising the consecutive addresses and a designated data block to which data stored in the consecutive addresses is to be read.

* * * * *